(12) United States Patent
Ionov

(10) Patent No.: US 7,330,304 B2
(45) Date of Patent: Feb. 12, 2008

(54) METHOD AND APPARATUS FOR PPM DEMODULATION USING A SEMICONDUCTOR OPTICAL AMPLIFIER

(75) Inventor: Stanislav I. Ionov, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 801 days.

(21) Appl. No.: 10/701,378

(22) Filed: Nov. 3, 2003

(65) Prior Publication Data

US 2005/0095010 A1    May 5, 2005

(51) Int. Cl.
*H01S 5/00* (2006.01)
*H01S 4/00* (2006.01)
*H04B 10/12* (2006.01)

(52) U.S. Cl. ............... 359/344; 359/333; 398/175
(58) Field of Classification Search ............ 359/344, 359/333; 398/175
See application file for complete search history.

(56) References Cited

U.S. PATENT DOCUMENTS

| | | | | |
|---|---|---|---|---|
| 4,584,720 A * | 4/1986 | Garrett | | 398/191 |
| 4,923,291 A * | 5/1990 | Edagawa et al. | | 359/334 |
| 4,939,474 A * | 7/1990 | Eisenstein et al. | | 359/344 |
| 5,165,077 A * | 11/1992 | Rokugawa et al. | | 398/101 |
| 5,208,455 A | 5/1993 | Nelson et al. | | 250/227.19 |
| 5,717,797 A | 2/1998 | Evans | | 385/27 |
| 5,917,649 A * | 6/1999 | Mori et al. | | 359/341.31 |
| 6,424,773 B1 | 7/2002 | Watanabe | | 385/122 |
| 6,462,860 B1 | 10/2002 | Ionov | | 359/325 |
| 6,466,703 B1 | 10/2002 | Ionov | | 385/10 |
| 6,762,878 B2 * | 7/2004 | Park et al. | | 359/341.42 |
| 6,901,177 B2 | 5/2005 | Ionov | | 385/15 |
| 7,076,174 B2 * | 7/2006 | Watanabe et al. | | 398/158 |
| 7,113,329 B2 * | 9/2006 | DiJaili et al. | | 359/344 |
| 2002/0021462 A1 * | 2/2002 | Delfyett et al. | | 359/123 |
| 2003/0219195 A1 | 11/2003 | Ionov | | 385/15 |
| 2005/0013543 A1 | 1/2005 | Ionov | | 385/39 |

FOREIGN PATENT DOCUMENTS

EP        0 521 671 A2    1/1993
WO        01/95526 A2    12/2001

OTHER PUBLICATIONS

U.S. Appl. No. 10/735,071, filed Dec. 12, 2003, Ionov.

(Continued)

*Primary Examiner*—Jack Keith
*Assistant Examiner*—Eric Bolda
(74) *Attorney, Agent, or Firm*—Ladas & Parry

(57) ABSTRACT

An optical pulse position modulation receiver relying on the gain dynamics in a semiconductor optical amplifier (SOA). Optical PPM signal pulses and periodic optical clock pulses at a different frequency and/or polarization than the signal pulses are coupled into an SOA. Due to the high optical power of the clock pulses, the SOA gain will drop to a small value after each clock pulse. The SOA will then amplify each signal pulse that follows the clock pulse, and the gain will depend on the delay between the signal pulse and the preceding optical clock pulse. The optical output of the SOA can then be converted to an electrical signal by a photodetector.

27 Claims, 2 Drawing Sheets

OTHER PUBLICATIONS

Petermann, K., "Basic Laser Characteristics," *Laser Diode Modulation and Noise*, Kluwer Academic Publishers, Dordrecht/Boston/London, Chapter 2, pp. 4-59 (1988).

U.S. Appl. No. 10/973,696, filed Oct. 25, 2004, Ionov.

U.S. Appl. No. 11/033,571, filed Jan. 11, 2005, Ionov.

Agraval, G.P., "Optical Solitons," *Nonlinear Fiber Optics*, Chapter Five, Academic Press, New York, pp. 133-152 (1995).

Bigo, S., et al., "All-Optical Fiber Signal Processing and Regeneration for Soliton Communications," *IEEE Journal of Selected Topics in Quantum Electronics*, vol. 3, No. 5, pp. 1208-1222 (Oct. 1997).

Black, H.S., *Modulation Theory*, D. Van Nostrand Company, Inc., New York, pp. 283-298 (1953).

Diez, S., et al., "Gain-Transparent SOA-Switch for High-Bitrate OTDM Add/Drop Multiplexing," *IEEE Photonics Technology Letters*, vol. 11, No. 1, pp. 60-62 (Jan. 1999).

Haus, H.A., *Waves and Fields in Optoelectronics*, Prentice-Hall, Inc., Englewood Cliffs, New Jersey, pp. 216-220 (1984).

Schubert, C., et al., "160-Gb/s All Optical Demultiplexing Using a Gain-Transparent Ultrafast-Nonlinear Interferometer (GT-UNI)," *IEEE Photonics Technology Letters*, vol. 13, No. 5, pp. 475-477 (May 2001).

Schubert, C., et al., "Comparison of Interferometric All-Optical Switches for Demulitplexing Applications in High-Speed OTDM Systems," *Journal of Lightwave Technology*, vol. 20, No. 4, pp. 618-624 (Apr. 2002).

Wang, D., et al., "Nonlinear Optical Loop Mirror Based n Standard Communication Fiber," *Journal of Lightwave Technology*, vol. 15, No. 4, pp. 642-646 (Apr. 1997).

* cited by examiner

METHOD AND APPARATUS FOR PPM DEMODULATION USING A SEMICONDUCTOR OPTICAL AMPLIFIER

BACKGROUND

1. Field

The present disclosure relates to coherent detection of pulse position modulated signals. More particularly, the present disclosure describes a method and apparatus using a semiconductor optical amplifier (SOA) for demodulating optical pulse position modulated signals.

2. Description of Related Art

Many satellite and terrestrial optical communication systems require transmission of analog optical signals. The straightforward way to address this need is to modulate the amplitude of an optical carrier. This approach, however, suffers from poor signal-to-noise ratio (SNR). It is well known that broadband modulation techniques, which utilize higher bandwidth than that of the transmitted waveform, may improve SNR over that achieved with amplitude modulation. Pulse Position Modulation (PPM) is one of these techniques. In PPM, a temporal shift in the pulse position represents a sample of the transmitted waveform. The improvement in SNR near the Nyquist sampling frequency of a pulse position modulated signal over an amplitude modulated signal is shown below:

$$SNR_{ppm} \propto SNR_{am}(t_p/\tau)^2$$

where $t_p$ is the temporal spacing between unmodulated pulses and $\tau$ is the pulse duration.

Conventional detection or demodulation of analog PPM optical signals, though, suffers from poor SNR at low frequencies. PPM signals are usually demodulated from the optical to electronic domain by a photodiode followed by a lowpass filter (LPF) that converts pulse position modulation to amplitude modulation. Such a demodulation technique is not capable of recovering the DC component, since the DC component is represented by a constant temporal shift of all pulses from their unmodulated positions. Moreover, the demodulated signals after the lowpass filter have very low amplitude at low frequencies. The amplitude increases linearly with frequency up to the Nyquist limit. Such frequency-dependent distortion is corrected by an integration circuit, which amplifies low-frequency noise accordingly, resulting in decreased SNR performance.

An apparatus and method for detecting an optical PPM signal are described in U.S. Pat. No. 6,462,860, issued to Ionov on Oct. 8, 2002. This patent application describes coherent wavelength converters that are used to generate preferably top hat shaped optical pulses. Top hat shaped optical pulses are preferred in the apparatus and method described in U.S. Pat. No. 6,462,860, since such pulses provide for better linearity of the detected optical PPM signal. Top hat shaped optical pulses may also be used in other optical systems known in the art. U.S. Pat. No. 6,462,860 describes the generation of top hat shaped pulses with non-linear optical mirrors (NOLMs).

Another embodiment of a top hat pulse generator suitable for use in optical pulse position modulation detection is described in U.S. patent application Ser. No. 10/341,689, filed on Jan. 13, 2003 and entitled "An Optical Top Hat Pulse Generator." The apparatus described in U.S. Ser. No. 10/341,689 uses NOLMs that are controlled by first order solitons. Still another embodiment of a top hat pulse generator suitable for use in optical pulse position modulation detection is described in U.S. Provisional Patent Application Ser. No. 60/488,540 filed on Jul. 18, 2003 and entitled "Method and Apparatus for Optical Top-Hat Pulse Generation." The embodiment described in U.S. Ser. No. 60/488,540 also uses an NOLM controlled by first order solitons, but the NOLM also comprises one or more sections of polarization maintaining fiber coupled to each other at 90 degree angles.

While optical PPM receivers based on optical top-hat pulse generation provide outputs with the desired linearity, such NOLM-based receivers have drawbacks due to their complexity. The NOLMs may require careful balancing and adjustments to achieve the desired linearity. Further, the NOLM-based receivers may also require a number of erbium-doped fiber amplifiers (EDFAs) and optical filters with flat dispersion. These components increase the complexity and cost of such NOLM-based receivers. Therefore, there is a need in the art for a PPM receiver with less complexity than those PPM receivers known in the art.

SUMMARY

An optical pulse position modulation receiver according to an embodiment of the present invention relies on the gain dynamics in a semiconductor optical amplifier (SOA). Optical PPM signal pulses and periodic optical clock pulses at a different frequency and/or polarization than the signal pulses are coupled into an SOA. Due to the high optical power of the clock pulses, the SOA gain will drop to a small value after each clock pulse. The SOA will then amplify each signal pulse that follows the clock pulse, and the gain will depend on the delay between the signal pulse and the preceding optical clock pulse. The optical output of the SOA can then be converted to an electrical signal by a photodetector.

A first embodiment according to the present invention provides an optical pulse position modulation receiver comprising: a semiconductor optical amplifier; a filter apparatus receiving an output of the semiconductor optical amplifier, said filter apparatus suppressing optical clock pulses output by the semiconductor optical amplifier and passing an amplified optical pulse position modulated signal output by the semiconductor optical amplifier; and an optical to electric converter receiving the amplified optical pulse position modulated signal, wherein the optical clock pulses input to the semiconductor optical amplifier have an optical power at a level to reduce or saturate the stimulated emission transition of the semiconductor optical amplifier.

Another embodiment according to the present invention provides an optical pulse position modulation detector comprising: optical amplification means receiving an input comprising optical pulse position modulated pulses and receiving optical clock pulses, said optical amplification means providing a gain for each pulse of said optical pulse position modulated pulses proportional to a delay from a preceding optical clock pulse of said optical clock pulses; filtering means receiving an output of said optical amplification means, said filtering means suppressing optical clock pulses output by said optical amplification means and passing amplified optical pulse position modulated pulses output by said optical amplification means; and optical to electric conversion means receiving said amplified optical pulse position modulated pulses and providing an electrical output corresponding to said amplified optical pulse position modulated pulses.

Still another embodiment according to the present invention provides a method for optical pulse position modulation detection comprising: optically amplifying an input comprising optical pulse position modulated pulses and optical clock pulses to provide an optical output having amplified optical pulses wherein each amplified optical pulse of the amplified optical pulses has a gain proportional to a delay between each optical pulse position modulated pulse and a preceding optical clock pulse; filtering the optical output to suppress optical clock pulses and to pass said amplified optical pulses. The filtered optical output may then be converted to an electrical signal by optical to electrical conversion.

DETAILED DESCRIPTION

Embodiments of the present invention now will be described more fully hereinafter with reference to the accompanying drawings, in which some embodiments of the invention are shown. This invention may be embodied in many different forms and should not be construed as limited to the embodiments set forth herein.

Figure 1:
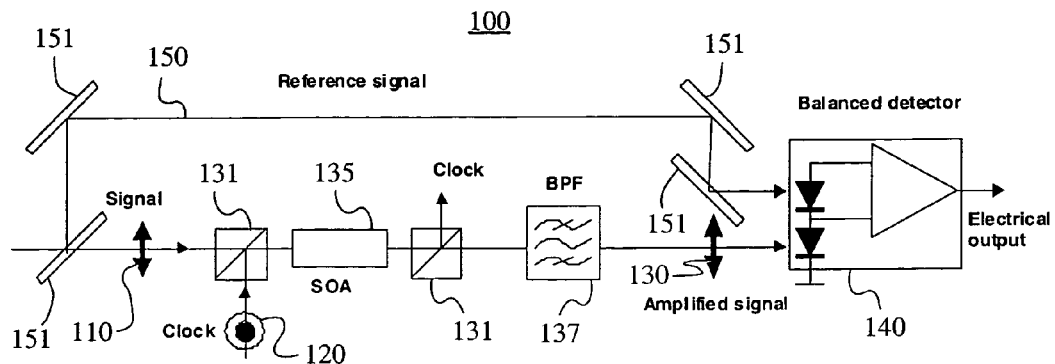
FIG. 1 shows a block diagram of an embodiment of an optical pulse position modulation receiver according to the present invention.

A schematic diagram of a PPM demodulator 100 according to an embodiment of the present invention is shown in FIG. 1. The PPM demodulator 100 may also be referred to as a PPM receiver. Optical PPM signal pulses 110 and optical clock pulses 120 may have different wavelengths and/or different polarizations. The optical PPM signal pulses 110 and optical clock pulses 120 are combined and coupled into a semiconductor optical amplifier (SOA) 135. In FIG. 1, the optical clock pulses 120 have a polarization that is orthogonal to that of the optical PPM signal pulses 110. Therefore, in FIG. 1, the optical PPM signal pulses 110 and optical clock pulses 120 are combined in a polarization combiner 131 and directed to the SOA 135. However, other means known in the art may be used to combine the optical PPM signal pulses 110 and optical clock pulses 120 for coupling into the SOA 135, such as, for example, a wavelength multiplexer/demultiplexer, if the optical PPM signal pulses 110 and optical clock pulses 120 have different wavelengths. Still other wavelength independent and/or polarization independent coupling means may be used for coupling the optical PPM signal pulses 110 and the optical clock pulses 120 into the SOA 135, such as a power combiner, a 3 dB optical coupler, a 10 dB optical coupler or any other such coupler known in the art.

The orthogonally polarized optical clock pulses 120 are filtered out from the optical PPM signal pulses 110 after the SOA 135 using another polarization coupler 135 (and/or a bandpass filter 137 if the signal 110 and clock pulses 120 have different wavelengths). The polarization coupler 131 is shown in FIG. 1 for illustrative purposes. Alternatively, as noted above, a wavelength mux/demux, a 3 dB coupler, or other such devices may also be used for combining the signal 110 and clock pulses 120 before the SOA 135 and extracting the clock pulses 120 after the SOA 135.

Figure 2A:
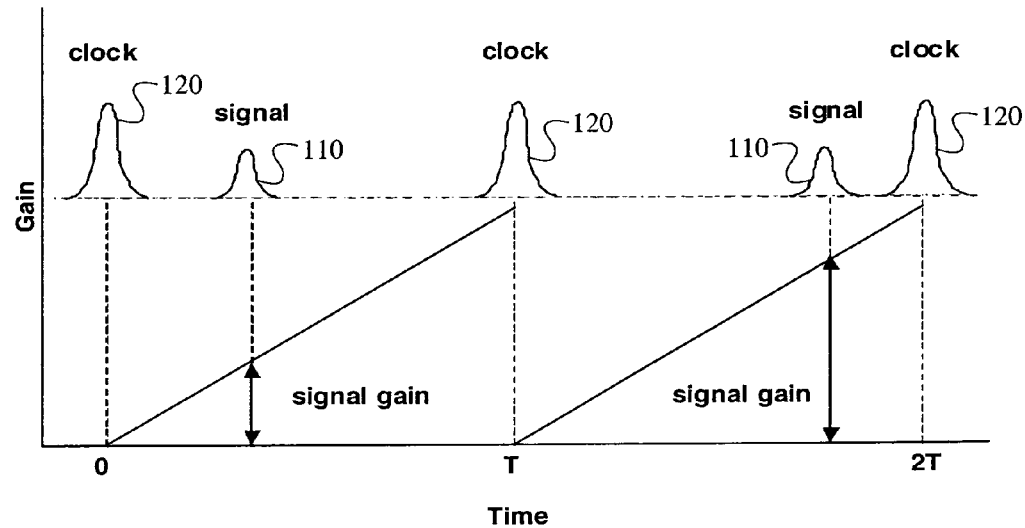
FIG. 2A shows a timing diagram illustrating the gain dynamics of the SOA used in embodiments of the present invention.
Figure 2B:
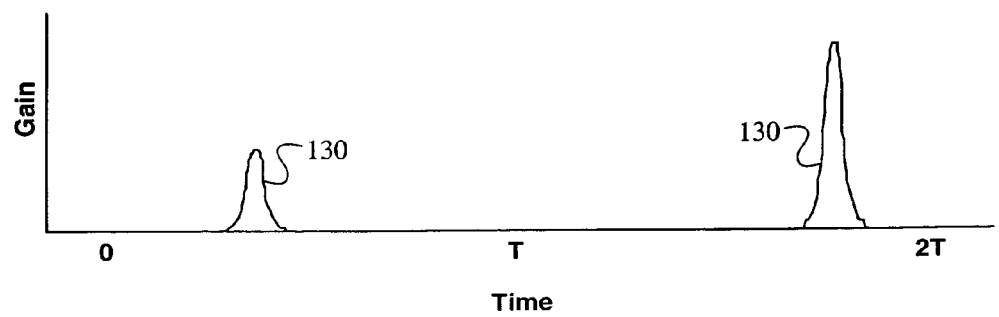
FIG. 2B shows a timing diagram for optical output power from the SOA for the optical signal pulses depicted in FIG. 2A.

A timing diagram demonstrating the operational principle of the embodiment of the optical PPM demodulator according to the present invention based on gain dynamics in a semiconductor optical amplifier (SOA) is shown in FIG. 2A. In a preferred configuration of the SOA 135, the clock pulses 120 are sufficiently energetic to saturate the stimulated emission transition of the SOA 135, so that the SOA gain drops to small value after each clock pulse 120. In other configurations of the SOA 135, the optical clock pulses 120 may have sufficient energy to merely reduce the stimulated emission transition of the SOA 135 to still provide that the SOA gain drops after each clock pulse 120. Preferably, the signal pulses 110 are considerably weaker, so that they do not affect the SOA dynamics significantly. The SOA gain recovers between the clock pulses 120 and a quasi-equilibrium is maintained. As seen from FIG. 2A, the gain experienced by a weak signal pulse 110 depends on its delay from the preceding clock pulse 120. FIG. 2B illustrates the amplitude of the amplified signal pulse 130 after amplification by the SOA 135 according to the gain dynamics described above.

FIG. 1 illustrates an embodiment in which a reference signal channel 150 and a balanced detector 140 is used to extract the signal gain. The optical PPM signal pulses 110 in the reference channel 150 may be directed to the balanced detector 140 by mirrors 151 or other such optical means known in the art. At the balanced detector 140, the amplified signal pulses 130 (which contain the optical PPM signal pulses 110 plus the gain) are subtracted from the optical PPM signal pulses 110 to obtain the gain, which, as described above, is proportional to the delay of each optical PPM signal pulse 110 from its corresponding clock pulse 120. Preferably, the two arms of the receiver 100 have identical optical length and the balanced detector 140 is adjusted to give zero output when the optical PPM signal pulses 110 have minimal delays with respect to the clock pulses 120.

Alternatively, the amplified signal pulses 130 may be coupled directly to a single-channel photodetector for conversion of the optical signals to electrical signals. In this case, the DC bias present in the output from the single-channel photodetector is preferably removed electronically.

As discussed above, embodiments of the PPM demodulator according to the present invention rely upon obtaining certain gain characteristics from the SOA or other such optical amplification devices. An analysis of the requisite gain dynamics is presented below.

It is assumed that the carrier density of the SOA does not change much in quasi-steady-state conditions, and, therefore, a linearized equation describing the dynamics of carrier density n may be used (see also Petermann, "Laser Diode Modulation and Noise," Chapter 2, Kluwer Academic Publishers, Dordrecht/Boston/London, 1988):

$$\frac{dn(z)}{dt} = \frac{I}{eV} - \frac{n(z)}{\tau} - g(z)v_g S \qquad \text{Eq. 1}$$

In Eq. 1, g is gain, $\tau$ is the carrier lifetime, $v_g$ is the group velocity of light, S is the photon density, I is the current, and V is the SOA volume.

The optical power changes along the SOA according to the following equation:

$$\frac{dP}{dz} = g(z)P \qquad \text{Eq. 2}$$

Note that:

$$v_g h\nu S = A^{-1}\frac{dP}{dz} = A^{-1}g(z)P \qquad \text{Eq. 3}$$

where A is the SOA cross section.

Integrating Eq. 1 over the SOA length and using Eq. 3 and Eq. 4, the following is obtained:

$$A\frac{d}{dt}\int_0^L n(z)dz = \frac{I}{e} - \frac{A}{\tau}\int_0^L n(z)dz - \frac{1}{h\nu}\int_0^L \frac{dP}{dz}dz \qquad \text{Eq. 4}$$

Introducing the total number of carriers $$N = A\int_0^L n(z)dz,$$

Eq. 4 can be rearranged as follows:

$$\frac{dN}{dt} = \frac{I}{e} - \frac{N}{\tau} - \frac{\Delta P(t)}{h\nu} \qquad \text{Eq. 5}$$

where $\Delta P$ is the optical power gain.

Assuming very short optical pulses, Eq. 5 can be integrated over the pulse duration to obtain:

$$\Delta N = \Delta E/h\nu \qquad \text{Eq. 6}$$

Between the optical pulses $\Delta P=0$, so Eq. 5 provides the following:

$$\frac{dN}{dt} = \frac{I}{e} - \frac{N}{\tau} \qquad \text{Eq. 7}$$

which results in the following equation for N(t):

$$N(t) = \tau\frac{I}{e} + \left(N(0) - \tau\frac{I}{e}\right)\exp(-t/\tau) \qquad \text{Eq. 8}$$

where N(0) is the number of carriers left after each clock pulse.

Eq. 8 may be linearized for $t \ll \tau$ to obtain:

$$N(t) = N(0) + (\tau I/e - N(0))t/\tau \qquad \text{Eq. 9}$$

In the steady-state condition, the drop in the total number of carriers caused by a clock pulse (and equal to the number of photons created via stimulated emission) is compensated by the driving current between the pulses:

$$\Delta E/h\nu = -\Delta N = TI/e - N(0)T/\tau \qquad \text{Eq. 10}$$

Therefore, the saturated optical power may be calculated as follows:

$$\Delta P/h\nu = I/e - N(0)/\tau \qquad \text{Eq. 11}$$

For an SOA from JDS-Uniphase of San Jose, Calif. (Model No. CQF873), the saturated optical clock power at a current of I=0.3 A was found to be $\Delta P=20$ mW, including a ~3 dB loss from the SOA to an optical fiber. From the equations above, $N(0)=1.7\times10^9$ ($\tau=1$ ns) and $\Delta N=1.7\times10^7$ for T=100 ps. Therefore, the assumption that the small carrier density changes $\Delta N \ll N$ is satisfied. Note, however, that embodiments of the present invention are not limited to SOAs available from JDS-Uniphase.

The gain of an SOA may be found from the following equation:

$$G = P_{out}/P_{in} = \exp\left(\int_0^L g(z)dz\right) \qquad \text{Eq. 12}$$

To calculate the gain dynamics, the following linearized relationship with the carrier density may be used (see also Petermann, "Laser Diode Modulation and Noise," Chapter 2):

$$g = a(n-n_0) \qquad \text{Eq. 13}$$

Typically, $n_0 \sim 1.1\times10^{18}$ cm$^{-3}$ and $a \sim 3\times10^{-16}$ cm$^2$. However, in embodiments according to the present invention, the SOA preferably operates in heavily saturated conditions, where the emission cross section a is lower. Therefore, in these embodiments, $a=10^{-16}$ cm$^2$ may more accurately reflect the operating condition of the SOA. Combining Eq. 12 and Eq. 13, the SOA gain may be found as follows:

$$G = \exp(a(N/A - n_0 L)) \qquad \text{Eq. 14}$$

Figure 3:
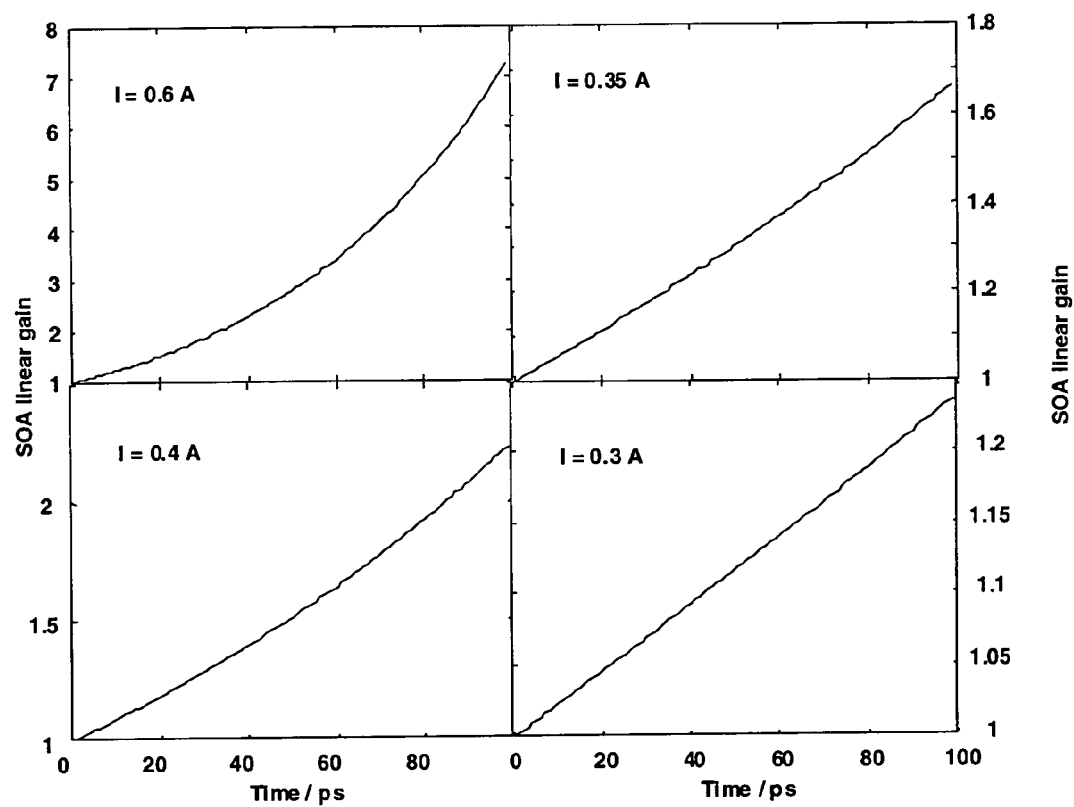
FIG. 3 shows the calculated gain dynamics of a SOA between two clock pulses for different driving currents.

FIG. 3 shows the calculated gain dynamics of a SOA between two clock pulses for different driving currents. It is noted that 0.6 A is typically the maximum current for SOAs from JDS-Uniphase. In the results presented in FIG. 3, it is assumed that $A=10^{-8}$ cm$^2$ and L=0.15 cm. From FIG. 3, it can be seen that at high currents, the SOA builds a significant gain (almost 9 dB) at the end of the clock window. However, at these higher currents, the gain is not linear. At smaller currents, the gain rises almost linearly, but the gain is significantly less. In preferred embodiments according to the present invention, the SOA current should be adjusted for suitable linearity and gain values.

As indicated above, the SOA should be operated so that the clock pulses saturate the stimulated emission transition. To saturate stimulated emission of an SOA by a single clock pulse, the energy of the clock pulse should exceed:

$$\frac{E}{h\nu} > \frac{A}{a} \qquad \text{Eq. 15}$$

For example, E>12 pJ and the total power P>120 mW for a 10 G/s pulse rate (T=100 ps).

From the foregoing description, it will be apparent that the present invention has a number of advantages, some of which have been described herein, and others of which are inherent in the embodiments of the invention described herein. Also, it will be understood that modifications can be made to the apparatus and method described herein without departing from the teachings of the subject matter described herein. As such, the invention is not to be limited to the described embodiments except as required by the appended claims.

What is claimed is:

1. A method for optical pulse position modulation detection comprising:
    optically amplifying an input comprising optical pulse position modulated pulses and optical clock pulses to provide an optical output having amplified optical pulses wherein each amplified optical pulse of said amplified optical pulses has a gain proportional to a delay between each optical pulse position modulated pulse and a preceding optical clock pulse; and
    filtering said optical output to suppress optical clock pulses and to pass said amplified optical pulses.

2. The method of claim 1, comprising:
    using a semiconductor optical amplifier having an input receiving an optical pulse position modulated signal and receiving optical clock pulses for optically amplifying the input comprising optical pulse position modulated pulses and optical clock pulses to provide the optical output having amplified optical pulses;
    using a filter apparatus receiving an output of said semiconductor optical amplifier, said filter apparatus suppressing optical clock pulses output by said semiconductor optical amplifier and passing an amplified optical pulse position modulated signal output by said semiconductor optical amplifier for filtering said optical output to suppress optical clock pulses and to pass said amplified optical pulses; and
    using an optical to electric converter receiving said amplified optical pulse position modulated signal for converting said amplified optical pulse position modulated signal into an electric signal;
    wherein said optical clock pulses have an optical power at a level to reduce the stimulated emission transition of said semiconductor optical amplifier.

3. The method of claim 2, wherein said optical clock pulses have a polarization different than a polarization of said optical pulse position modulated signal and the method further comprises:
    using a first polarization coupler with a first input receiving said optical pulse position modulated signal and a second input receiving said optical clock pulses and having an output coupled to said semiconductor optical amplifier;
    wherein the filter apparatus comprises: a second polarization coupler with an input receiving an output of said semiconductor optical amplifier, and having a first output configured to output optical signals having the polarization of said optical clock pulses and having a second output configured to couple optical signals having the polarization of said optical pulse position modulated signal to said optical to electric converter.

4. The method of claim 2, wherein said optical clock pulses have an optical wavelength different than that of the optical pulse position modulated signal and the method further comprises: using an optical coupler with a first input receiving said optical pulse position modulated signal and a second input receiving said optical clock pulses and an output coupled to said semiconductor optical amplifier; wherein the filter apparatus comprises:
    a bandpass filter with an input coupled to an output of said semiconductor optical amplifier, said bandpass filter suppressing optical signals at the optical wavelength of the optical clock pulses and passing optical signals at the optical wavelength of the optical pulse position modulated signal.

5. The method of claim 2, wherein said optical clock pulses have an optical wavelength and a polarization different than an optical wavelength and polarization of the optical pulse position modulated signal and the method further comprises:
    using an optical coupler with a first input receiving said optical pulse position modulated signal and a second input receiving said optical clock pulses and an output coupled to said semiconductor optical amplifier;
    wherein the filter apparatus comprises:
    a polarization coupler having an input receiving an output of said semiconductor optical amplifier, and having a first output configured to output optical signals having the polarization of said optical clock pulses and having a second output configured to couple optical signals having the polarization of said optical pulse position modulated signal to said optical to electric converter; or
    a bandpass filter with an input coupled to an output of said semiconductor optical amplifier, said bandpass filter suppressing optical signals at the optical wavelength of the optical clock pulses and passing optical signals at the optical wavelength of the optical pulse position modulated signal to said optical to electric converter; or
    a polarization coupler and a band pass filter combination, the polarization filter of said combination having an input receiving an output of said semiconductor optical amplifier, and the polarization coupler of said combination having a first output configured to output optical signals having the polarization of said optical clock pulses and having a second output configured to couple optical signals having the polarization of said optical pulse position modulated signal to an input of said bandpass filter of said combination, said bandpass filter of said combination suppressing optical signals at the optical wavelength of the optical clock pulses and passing optical signals at the optical wavelength of the optical pulse position modulated signal to said optical to electric converter.

6. The method of claim 2, wherein said optical to electric converter comprises a photodetector.

7. The method of claim 2, wherein said optical to electric converter comprises a balanced detector, said balanced detector having a first input receiving said optical pulse position modulated signal and a second input receiving said amplified optical pulse position modulated signal.

8. The method of claim 2 wherein a current for said semiconductor optical amplifier is controlled for desired linearity and gain characteristics for said semiconductor optical amplifier.

9. The method of claim 2, wherein said optical clock pulses have an optical power at a level to saturate the stimulated emission transition of said semiconductor optical amplifier.

10. The method of claim 1, comprising:
    using optical amplification means having an input receiving optical pulse position modulated pulses and receiving optical clock pulses, said optical amplification means providing a gain for each pulse of said optical pulse position modulated pulses proportional to a delay from a preceding optical clock pulse of said optical clock pulses, for optically amplifying the input comprising optical pulse position modulated pulses and optical clock pulses to provide the optical output having amplified optical pulses;

using filtering means receiving an output of said optical amplification means, said filtering means suppressing optical clock pulses output by said optical amplification means and passing amplified optical pulse position modulated pulses output by said optical amplification means; and using optical to electric conversion means for converting said amplified optical pulse position modulated signal into an electric signal, including receiving said amplified optical pulse position modulated pulses and providing an electrical output corresponding to said amplified optical pulse position modulated pulses.

11. The method of claim 10, wherein said optical clock pulses have one or more polarizations different than one or more polarizations of said optical pulse position modulated pulses and the method further comprises:

using a first polarization coupling means for coupling said optical pulse position modulated pulses and said optical clock pulses to said optical amplification means, wherein the filtering means comprises:

a second polarization coupling means receiving an output from said optical amplification means and producing an output comprising optical signals having the one or more polarizations of said optical pulse position modulated pulses.

12. The method of claim 10, wherein said optical clock pulses have one or more optical wavelengths different than one or more optical wavelengths of the optical pulse position modulated pulses and the method further comprises:

using optical coupling means for coupling said optical pulse position modulated pulses and said optical clock pulses to said optical amplification means;

wherein the filtering means suppresses optical signals at the one or more optical wavelengths of the optical clock pulses and passes optical signals at the one or more optical wavelengths of the optical pulse position modulated pulses.

13. The method of claim 10, wherein said optical clock pulses have one or more optical wavelengths and one or more polarizations different than one or more optical wavelengths and one or more polarizations of the optical pulse position modulated pulses and the method further comprises:

using optical coupling means for coupling said optical pulse position modulated pulses and said optical clock pulses to said optical amplification means, wherein the filter means comprises:

a polarization coupling means receiving an output from said optical amplification means and producing an output comprising optical signals having the one or more polarizations of said optical pulse position modulated pulses; or a filtering means that suppresses optical signals at the one or more optical wavelengths of the optical clock pulses and passes optical signals at the one or more optical wavelengths of the optical pulse position modulated pulses; or a polarization coupling means and filtering means combination, the polarization coupling means of said combination receiving an output from said optical amplification means and producing an output comprising optical signals having the one or more polarizations of said optical pulse position modulated pulses, said filtering means of said combination receiving an output from said polarization coupling means of said combination and suppressing optical signals at the one or more optical wavelengths of the optical clock pulses and passing optical signals at the one or more optical wavelengths of the optical pulse position modulated pulses.

14. The method of claim 10, wherein said optical to electric conversion means comprises a photodetection means.

15. The method of claim 10, wherein said optical to electric conversion means comprises balanced detection means receiving said optical pulse position modulated pulses and said amplified optical pulse position modulated pulses and producing an electrical output corresponding to a difference between said optical pulse position modulated pulses and said amplified optical pulse position modulated pulses.

16. The method of claim 10, wherein said optical amplification means comprises a semiconductor optical amplifier and wherein said optical clock pulses have an optical power at a level to reduce the stimulated emission transition of said semiconductor optical amplifier.

17. The method of claim 16 wherein a current for said semiconductor optical amplifier is controlled for desired linearity and gain characteristics for said semiconductor optical amplifier.

18. The method of claim 10, wherein said optical amplification means comprises a semiconductor optical amplifier and wherein said optical clock pulses have an optical power at a level to saturate the stimulated emission transition of said semiconductor optical amplifier.

19. The method according to claim 1, wherein said optical clock pulses have one or more polarizations different than one or more polarizations of said optical pulse position modulated pulses and said filtering said optical output comprises suppressing optical signals having the one or more polarizations of said optical clock pulses and passing optical signals having the one or more polarizations of said optical pulse position modulated pulses.

20. The method according to claim 1, wherein said optical clock pulses have one or more optical wavelengths different than one or more optical wavelengths of the optical pulse position modulated pulses and said filtering said optical output comprises suppressing optical signals at the one or more optical wavelengths of the optical clock pulses and passing optical signals at the one or more optical wavelengths of the optical pulse position modulated pulses.

21. The method according to claim 1, wherein said optical clock pulses have one or more optical wavelengths and one or more polarizations different than one or more optical wavelengths and one or more polarizations of the optical pulse position modulated pulses and said filtering said optical output comprises:

suppressing optical signals having the one or more polarizations of said optical clock pulses and passing optical signals having the one or more polarizations of said optical pulse position modulated pulses; or suppressing optical signals at the one or more optical wavelengths of the optical clock pulses and passing optical signals at the one or more optical wavelengths of the optical pulse position modulated pulses; or suppressing optical signals having the one or more polarizations and at the one or more optical wavelengths of said optical clock pulses and passing optical signals having the one or more polarizations and at the one or more optical wavelengths of said optical pulse position modulated pulses.

22. The method according to claim 1, further comprising converting said amplified optical pulses to an electrical output.

23. The method according to claim 22, wherein said converting said amplified optical pulses to an electrical output comprises coupling said amplified optical pulses to a photodetector.

24. The method according to claim 22, wherein said converting said amplified optical pulses to an electrical output comprises producing an electrical output corresponding to a difference between said optical pulse position modulated pulses and said amplified optical pulses.

25. The method according to claim 1, wherein said optically amplifying an input comprises coupling said optical pulse position modulated pulses and said optical clock pulses to a semiconductor optical amplifier and controlling an optical power of said optical clock pulses to reduce the stimulated emission transition of said semiconductor optical amplifier.

26. The method according to claim 25 wherein a current for said semiconductor optical amplifier is controlled for desired linearity and gain characteristics for said semiconductor optical amplifier.

27. The method according to claim 1, wherein said optically amplifying an input comprises coupling said optical pulse position modulated pulses and said optical clock pulses to a semiconductor optical amplifier and controlling an optical power of said optical clock pulses to saturate the stimulated emission transition of said semiconductor optical amplifier.

* * * * *